May 14, 1935. A. G. HEWITT 2,001,461
SHIRRED TUBING AND METHOD OF PREPARING THE SAME
Filed June 8, 1934
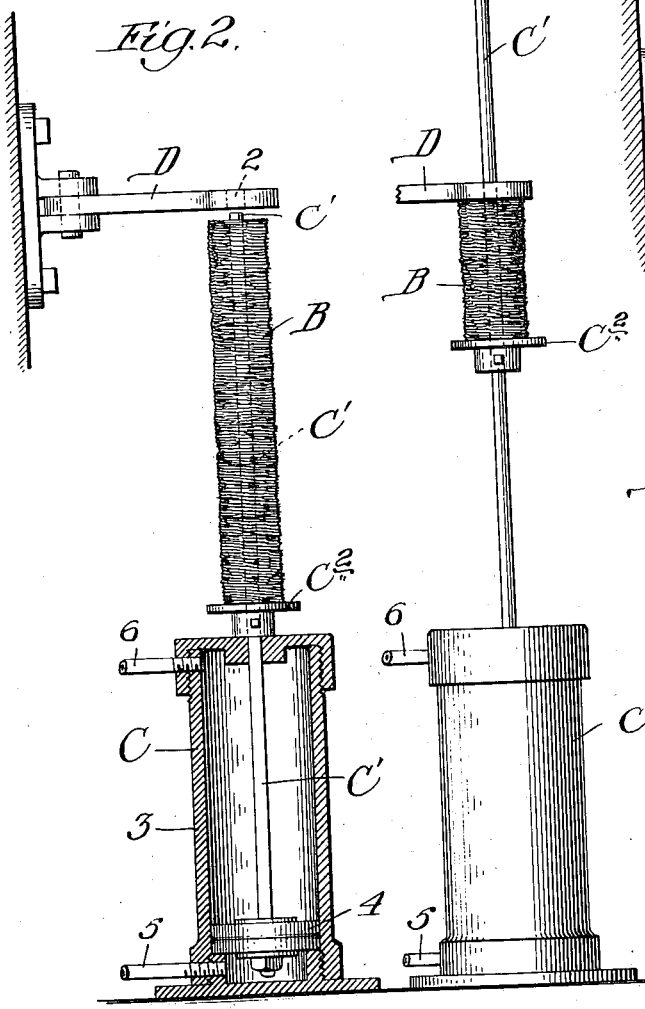
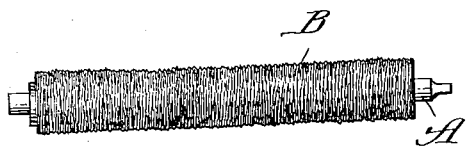
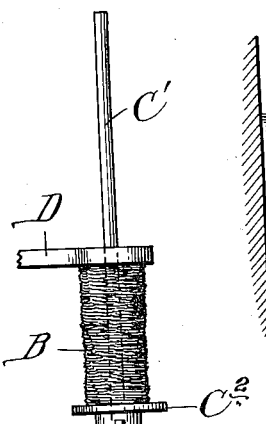
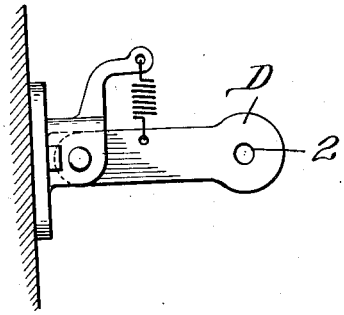
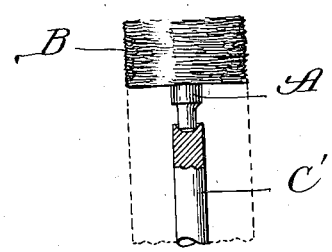
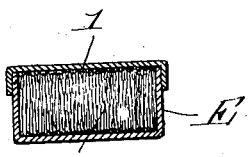
Inventor:
Alfred G. Hewitt,
By Dyrenforth, Lee, Chritton & Wiles
Attys.

Patented May 14, 1935

2,001,461

UNITED STATES PATENT OFFICE 2,001,461

SHIRRED TUBING AND METHOD OF PREPARING THE SAME

Alfred G. Hewitt, Chicago, Ill., assignor to The Visking Corporation, Chicago, Ill., a corporation of Virginia Application June 8, 1934, Serial No. 729,728

8 Claims. (Cl. 17—45)

This invention relates particularly to the preparation of artificial sausage-casings, such as may be prepared from a viscose solution by a suitable extruding, coagulating, regenerating, and purifying process.

In a process which is now being practiced commercially on a large scale, a suitable viscose solution is extruded in tubular form into a coagulating and regenerating bath, and is subsequently drawn through a purifying bath of water, and finally through a bath containing a hygroscopic agent, such as glycerine.

Heretofore, a method of packaging and shipping a product of this character, especially in the sizes suitable for sausage-stuffing purposes, has been to load the tubing, in shirred condition, upon a wooden rod, or elongated dowel-pin. The product was shipped in this form by the casing-manufacturer to packing concerns desiring to make use of the product for sausage-stuffing purposes. In this form, the shirred tubing could be slipped off the wooden supporting-rod onto the stuffer-horn of a sausage-filling machine.

In the practice referred to, it was the custom to shir a tubing-section of about 32 feet in length so that it would then occupy, on the carrying-support, a space of about 12 inches in length. The supporting rod was necessary to keep the shirred casing in suitable form, preserve it from injury, and enable it to be slipped onto the horn of the sausage machine.

The practice referred to involved, however, a large expense for the elongated dowel-pins used, increased freight charges, and involved operations which the present invention renders unnecessary.

I have discovered that it is possible to eliminate the use of the wooden dowel-pins for shipping purposes and for loading the shirred casing onto the stuffing-horn; also, that the packages may be greatly reduced in size safely, that shipment-weights may be reduced greatly, and that a more convenient handling method, generally, can be provided.

Thus, I have found that it is possible to make the shirred casings practically self-supporting without injury to the casings. This is accomplished, preferably, by first shirring a casing-section of suitable length, and then subjecting the shirred casing-section to an axial compressing operation. For example, a casing-section of about 32 feet in length may be first shirred (either by hand operation or by machine operation) upon a suitable mandrel, the length being thus reduced, say, to about 1/32 of the original length; and the preparatorily shirred casing may then be compressed to about 1/3 of the shirred-length by means of a suitable compressing device.

In another example, a casing-section of about 33 feet in length is reduced, by a mechanical shirring operation, to a shirred-length of about 16 inches; and thereafter, the casing is preferably compressed to a length of about 5¼ inches.

The examples given are applicable to cellulose tubing varying in diameter from about 23/32 of an inch to 1⅛". These are stated rather as examples, and not by way of limitation.

By the improved method, it is quite practicable, starting with a tube 396" in length, to reduce the length to less than 4", or substantially 1/100 of the original length. This can be done without injury to the casing. It is preferred, however, to reduce from a length of about 400" to about 5", that is, about 1/80 of the original length of the tubing. The lowest practical limit probably is in the neighborhood of 1/130th of the original length; and, for practical reasons, the upper limit should not be more than about 1/50 of the original length.

It may be stated that cellulose tubings of the diameters mentioned above ordinarily vary in thickness from a little more than .00072" for the smallest size to .0008" for the largest size.

The invention is illustrated in the accompanying drawing, in which—

Fig. 1 is a plan view of a mandrel, or elongated dowel pin, having thereon, in shirred condition, a cellulose sausage-casing; Fig. 2, a view illustrating apparatus for compressing the shirred casing, it being assumed that the casing has been transferred from the dowel-pin shown in Fig. 1 to the plunger of the compressor, as shown in Fig. 2; Fig. 3, an elevational view of the apparatus shown in Fig. 2, illustrating the condition at the end of the working stroke of the punger of the compressor; Fig. 4, a plan view of the pivotally mounted abutment which is shown in the upper portion of Fig. 2; Fig. 5, a broken view, partly in section, illustrating the manner in which the preliminarily shirred casing is transferred from the supporting dowel-pin to the compressor-plunger; and Fig. 6, a sectional view of a container within which is a compressed, shirred sausage-casing, which is held against expansion by the container.

In the illustration given, A designates a supporting rod, which may be of wood; B, a sausage-casing in shirred condition; C, a compressor equipped with a plunger C' upon which is secured a collar or abutment C²; and D, a pivotally mounted, withdrawable abutment adapted to coact with the abutment C².

In practicing the improved method, a suitably prepared cellulose casing is shirred upon a mandrel in any suitable manner. It may be done, for example, as shown in my copending application Ser. No. 729,727, filed of even date herewith, which is now Patent No. 1,993,480, dated March 5, 1935. The preliminarily shirred casing may have a shirred-length of perhaps 1/25th to 1/30th of the original length of the casing. That is, the length can conveniently be reduced in this manner by a simple shirring operation.

After the preliminary shirring operation, the shirred casing may be subjected to a compressing operation which will reduce it, roughly, to about one-third of its preliminary shirred-length. When thus compressed, the casing becomes self-supporting. However, while the casing, by the compressing operation, approaches a "set" condition, the resilience is not destroyed. Left to itself, the casing will very slowly expand in length. For this reason, it is desirable to introduce the shirred, compressed casing into some suitable form of retainer, such as is shown in Fig. 6. For example, in Fig. 6, E designates a cardboard box, say of about 4 or 5" in length, into which the compressed casing B has been placed. This box is shown provided with a removable cover I.

Where the preliminary shirring has been effected by hand operation, as illustrated in the application referred to above, it may be slid from the shirring-mandrel onto a supporting rod A, as shown in Fig. 1. The simple form of apparatus shown in the drawing may then be used to compress the shirred casing. Assuming the apparatus to be in the condition shown in Fig. 2 the pivoted abutment B is moved out of the way, the loaded dowel-pin shown in Fig. 1 is placed over the plunger C' in the manner shown in Fig. 5, and the shirred casing is slid downwardly onto the plunger C'. The pivoted member D is then allowed to return to its normal position, this member having a guide-perforation 2 through which the plunger C' may work in the compressing operation.

The compressor is shown in the form of a cylinder 3 fitted with a piston 4 and equipped with air-pipes 5 and 6 through which air may be admitted from a suitable source of supply in a known manner. The condition at the end of the working stroke is illustrated in Fig. 3. After the compression has been effected, the plunger is lowered and the compressed casing is slipped off the plunger and placed into a suitable retaining device to prevent undue expansion. The casing may, without detriment, be allowed to expand an inch or two after the compression has been effected.

The container shown in Fig. 6 may be used as a package for shipment; or other suitable form of package may be devised. After the compressed, shirred casing has been shipped to the packing house, it may be removed from the container and placed upon the stuffer-horn of a sausage-making machine. The casing may be stuffed in the usual manner.

As indicated by statements occurring above, the improved process and product result in very considerable economies in the manufacture and shipment of artificial sausage casings and in the employment thereof in packing-houses.

Various modifications for the practice of the process will suggest themselves to those skilled in the art. The limits of reduction in length set forth above are not to be taken as absolute. It is desirable to produce a preliminary shirred-length which is not substantially greater than 1/20th of the original length of the casing; and it is desirable, in the compressing operation, to reduce the length to a final length which is not substantially more than 50% of the preliminary shirred-length. Obviously, the degree of compression permissible after the preliminary shirring operation will depend considerably upon the closeness of the folds at the end of the preliminary shirring operation. The greater the shirred length at the end of the preliminary operation, the greater may be the compression without injury to the casing.

The foregoing detailed description has been given for clearness of understanding only, and no undue limitations should be understood therefrom, but the appended claims should be construed as broadly as permissible, in view of the prior art.

What I regard as new and desire to secure by Letters Patent is:

1. A method of preparing an artificial sausage-casing for shipping and handling which comprises: preliminarily shirring the casing; and then subjecting the shirred product to a compressing operation which forces the folds into close mutually supporting relation, thus forming a self-sustaining product.

2. A method of preparing an artificial sausage-casing for shipping and handling which comprises: preliminarily shirring the casing; then subjecting the shirred product to a compressing operation which forces the folds into close mutually supporting relation; and confining the shirred, compressed product against undue expansion in a container with loading-mandrel omitted.

3. A method of preparing an artificial sausage-casing for shipment and use which comprises: preliminarily shirring the casing and reducing it to a shirred-length which is not substantially greater than 1/20th of the original length of the casing; then compressing the preliminarily shirred casing to a length not substantially greater than 50% of the preliminary shirred-length.

4. A method of preparing an artificial sausage-casing, or the like, for shipping and handling, which comprises: preliminarily shirring a casing and reducing it to a shirred-length which is between 1/20th and 1/30th of the original length; compressing the preliminarily shirred casing to less than one-half the shirred-length; and confining the casing against undue expansion.

5. As a new article of manufacture, a mandrel-less shirred, compressed cellulose sausage-casing having its folds in close mutually supporting relation, and a retainer preventing undue expansion of said shirred, compressed casing.

6. As a new article of manufacture, a mandrel-less shirred, compressed casing whose compressed length is not substantially greater than 1/50th of the length of the casing.

7. As a new article of manufacture, a compressed, shirred mandrel-less casing having a length within the limits of 1/50th to 1/130th of the original length of the casing.

8. As a new article of manufacture, a compressed, shirred mandrel-less casing having a length within the limits of 1/50th to 1/130th of the original length of the casing, and retaining means for preventing undue expansion of said compressed, shirred casing.

ALFRED G. HEWITT.